(12) United States Patent
Cox et al.

(10) Patent No.: US 8,315,289 B2
(45) Date of Patent: Nov. 20, 2012

(54) OPTICAL APPARATUS AND METHOD

(75) Inventors: Alan M. Cox, Cheshire (GB);
Jean-Charles Cotteverte, Cheshire (GB)

(73) Assignee: Laser Quantum Limited, Cheshire (GB)

( * ) Notice: Subject to any disclaimer, the term of this patent is extended or adjusted under 35 U.S.C. 154(b) by 38 days.

(21) Appl. No.: 12/319,333

(22) Filed: Jan. 5, 2009

(65) Prior Publication Data
US 2009/0225798 A1 Sep. 10, 2009

(30) Foreign Application Priority Data
Jan. 7, 2008 (GB) .................................. 0800210.7

(51) Int. Cl.
*H01S 3/094* (2006.01)
*H01S 3/0941* (2006.01)

(52) U.S. Cl. ................. 372/68; 372/27; 372/71; 372/72

(58) Field of Classification Search .................... 372/27, 372/68, 71, 72
See application file for complete search history.

(56) References Cited

U.S. PATENT DOCUMENTS

| | | | | |
|---|---|---|---|---|
| 5,588,014 A * | 12/1996 | Okazaki et al. | .................. | 372/22 |
| 5,638,397 A * | 6/1997 | Nighan et al. | ................... | 372/92 |
| 6,047,014 A | 4/2000 | Hyuga et al. | | |
| 6,144,484 A | 11/2000 | Marshall | | |
| 7,502,404 B2 | 3/2009 | Murdoch et al. | | |
| 2004/0101015 A1 * | 5/2004 | Butterworth | .................... | 372/70 |
| 2005/0069009 A1 | 3/2005 | Knappe et al. | | |
| 2005/0152426 A1 * | 7/2005 | Dell'Acqua et al. | ............ | 372/69 |
| 2005/0259325 A1 * | 11/2005 | Ghidini et al. | ................ | 359/487 |
| 2007/0189343 A1 * | 8/2007 | Seelert et al. | .................... | 372/22 |
| 2008/0095210 A1 | 4/2008 | Murdoch et al. | | |

FOREIGN PATENT DOCUMENTS

| | | |
|---|---|---|
| EP | 1482607 | 12/2004 |
| EP | 1482608 | 12/2004 |
| EP | 1891718 | 2/2008 |
| JP | 5095144 | 10/1991 |
| JP | 2000307179 | 11/2000 |
| JP | 2006032768 | 7/2004 |
| JP | 2006135262 | 5/2006 |
| WO | WO 03/061085 | 7/2003 |
| WO | WO 2007/101029 | 9/2007 |
| WO | WO 2008/051398 | 5/2008 |

OTHER PUBLICATIONS

McDonagh, et al. "Optimized Pumping of Nd:YVO4 with polarization sensitive absorption for high power applications," Conf. on Laser and Electro-Optics (CLEO), May 2005.

* cited by examiner

*Primary Examiner* — Patrick Stafford
*Assistant Examiner* — Michael Carter
(74) *Attorney, Agent, or Firm* — Smyrski Law Group, A P.C.

(57) ABSTRACT

An optical apparatus comprising a gain medium exhibiting polarisation dependent absorption along two axes, the gain medium having a weakly absorbing axis and a strongly absorbing axis, an optical pump source arranged to direct pump light towards a first face of the gain medium such that the pump light entering the gain medium has a component of its polarisation parallel to the weakly absorbing axis, a polarisation modifying apparatus and one or more reflectors which are together arranged to modify the polarisation of pump light which exits the gain medium through a second face of the gain medium, and to direct the pump light with modified polarisation back towards said second face of the gain medium.

16 Claims, 15 Drawing Sheets

OPTICAL APPARATUS AND METHOD

This application claims priority to Great Britain Patent Application No. GB 0800210.7, filed on Jan. 7, 2008, which is incorporated herein by reference in its entirety.

The present invention relates to an optical apparatus and method.

Over the last decade, DPSS laser systems have become increasingly popular in many industrial applications. DPSS lasers consist of at least one solid state laser gain medium (e.g. a "lasing crystal" or "laser crystal") that is pumped by one or more diode lasers. DPSS lasers are relatively compact and efficient. Consequently, they have replaced both lamp pumped and gas discharge laser systems in many applications.

Early diode end-pumped solid-state lasers were limited in power due to the relatively low brightness of the available diode lasers. Such DPSS lasers consisted mainly of single-stripe diode laser pumped systems, typically providing an output of around 1 Watt or less of infrared light (or around half that for frequency-doubled lasers). Although laser diodes in the form of diode bars were capable of delivering higher powers than single-stripe diode lasers, the technology to reformat the highly asymmetric output into a more symmetrical shape for use in end-pumping lasers was in its infancy.

More recently, laser diode technology has improved to give outputs of much higher brightness. Further, the technology to efficiently reformat the output light of one or more laser diodes into a more symmetrical shape has also improved. This has enabled laser designers to increase the output power of DPSS lasers to many tens of Watts in the fundamental wavelength in a $TEM_{00}$ mode. In many cases, the available brightness of the light from the laser diode is no longer the major technical hurdle in power scaling (increasing the output power of) diode pumped solid-state lasers. Careful thermal design to efficiently remove waste heat has become much more important, as well as careful control of the thermal lensing within the laser gain medium, especially within fundamental spatial mode ($TEM_{00}$) systems.

One known method of power scaling such a DPSS laser system is to focus pump light into both ends of the laser gain medium at the same time. This "double-end pumping" allows for more absorbed pump power within the gain medium before approaching the thermal fracture limit of the gain medium (e.g. the laser crystal). This is often achieved by two independent pump sources, but some of the benefits of double end pumping can be obtained by double-passing the pump light through the gain medium in order to achieve a more uniform pump light distribution and lower thermal lensing.

Other known methods for spreading the thermal load are to use a gain medium with a lower dopant concentration, or to use a lower absorbing pump wavelength.

Use of a pump wavelength with a lower quantum defect in the gain medium yields less heating for the same absorbed power. An example of this is direct pumping of the upper lasing level in crystals such as $Nd:YVO_4$ using pump light at approximately 880 nm. Whilst the absorption line at 880 nm is attractive because of its smaller quantum defect (when compared with for example 808 nm), the polarisation dependence of the absorption spectrum is not helpful. The weaker 'a-axis' absorption is spectrally narrow, and is slightly offset in wavelength compared to the stronger 'c-axis' absorption. Depending on the exact pump wavelength (or wavelength spread of the pump), this can lead to a very strong polarisation dependence of the absorption line.

In many crystalline gain media, especially $Nd:YVO_4$, absorption is generally polarisation-dependent to some degree for most wavelengths. The most strongly absorbing polarisation concentrates the thermal load closer to the input face, whilst the less absorbing polarisation spreads the thermal load more along the pump direction. The two differing absorption depths make it difficult to optimise the pump absorption profile. The non-uniform pump absorption is a disadvantage because, for a given amount of absorbed pump power, it leads to stronger thermal lens effects.

Another method of power scaling such a diode pumped solid state laser system consists of using special gain crystals having bonded undoped end-caps (for example as described in U.S. Pat. No. 6,144,484 (Marshall)). These undoped end-caps are non-absorbing at pump light wavelengths, but conduct heat away from the doped section in order to spread heat longitudinally. This can result in a more uniform heat dissipation, and a weaker thermal lens.

It is also known that the laser diode 'pump' light can be launched into an optical fibre, before being focussed into the laser gain medium. This method has two advantages;

1) The light emitted from the optical fibre is likely to be more cylindrically symmetric in profile than the light entering the fibre, leading to a more cylindrically symmetrical thermal lens which typically has lower aberration.
2) The pump diode and its waste heat can be physically separated from the laser head/cavity, leading to a smaller laser head which in turn dissipates less heat.

A disadvantage of this fibre-pump method is that the output light from the fibre is likely to be less polarised than the input light. A further disadvantage is that the polarisation state of the output light may change if the optical fibre is moved (for example due to vibrations or other movement in the operating environment of the laser). This can lead to fluctuations in the output of the DPSS laser, for example if the laser gain medium has different absorption coefficients along different crystallographic axes.

It is known to provide DPSS laser systems using double-end pumping in conjunction with fibre-coupled pumping, incorporating two separate laser diode units launched into two separate optical fibres. The output of each of the fibres is focussed into opposite ends of the laser gain medium. This method can lead to outputs of tens of Watts of fundamental wavelength or over 10 Watts of frequency doubled light in a $TEM_{00}$ mode. However, each of the pump beams may have one polarisation component strongly absorbed, whilst the other may be more weakly absorbed.

One way of improving this setup is to choose a pump wavelength for which the absorption coefficients for each of the axes of the gain medium are similar, for example as described in EP1482607 (Nebel). In $Nd:YVO_4$ this can be achieved at around 888 nm, but may also be achieved at a number of other wavelengths. When this is done, the absorption depth becomes relatively insensitive to the polarisation of the pump light. On double-passing through the gain medium, the absorption of the pump light can be made somewhat more uniform throughout the gain medium.

It is an object of the invention to provide an optical apparatus and method which overcomes or mitigates at least one of the aforementioned disadvantages.

According to a first aspect of the present invention there is provided an optical apparatus comprising a gain medium exhibiting polarisation dependent absorption along two axes, the gain medium having a weakly absorbing axis and a strongly absorbing axis, an optical pump source arranged to direct pump light towards a first face of the gain medium such that the pump light entering the gain medium has a component of its polarisation parallel to the weakly absorbing axis, a polarisation modifying apparatus and one or more reflectors which are together arranged to modify the polarisation of pump light which exits the gain medium through a second face of the gain medium, and to direct the pump light with modified polarisation back towards said second face of the gain medium.

One or more of the elements comprising the first aspect of the invention may be combined in a single component. For example, the gain medium may be provided with a reflector.

An advantage of the invention is that it may facilitate the power-scaling of a laser cavity or amplifier, by spreading thermal loading due to the pump light more evenly along the laser gain medium. This may lead to lower thermal lensing and lower aberrations within the gain medium, which may in turn lead to improved efficiency or improved laser beam quality.

At least 20 percent of the component of light which on exiting the gain medium is polarised parallel to the weakly absorbing axis of the gain medium, may be polarised parallel to the strongly absorbing axis of the gain medium when it is directed back towards the second face of the gain medium.

The polarisation modifying apparatus may be a wave plate.

The polarisation modifying apparatus may comprise a quarter-wave plate, the one or more reflectors being arranged to reflect pump light which has passed through the quarter-wave plate, such that the pump light passes back through the quarter-wave plate and onto the second face of the gain medium.

The polarisation modifying apparatus may comprise a half-wave plate, the one or more reflectors being arranged to direct pump light which has passed through the half-wave plate, such that the pump light is incident upon the second face of the gain medium.

The gain medium may form part of a laser cavity.

The laser cavity may further comprise a nonlinear optical crystal located within the laser cavity and arranged to frequency convert laser light within the laser cavity.

The polarisation modifying apparatus and the one or more reflectors may be located outside of the laser cavity.

The polarisation modifying apparatus and the one or more reflectors may be located within the laser cavity.

The polarisation modifying apparatus may be located within the laser cavity and the one or more reflectors may also be one of the laser cavity mirrors.

The polarisation modifying apparatus may be configured to modify the polarisation of the pump light but not to significantly modify the polarisation of the laser light.

The optical apparatus may further comprise a second optical pump source, a second polarisation modifying apparatus with associated one or more reflectors, and a second gain medium, the second gain medium being positioned in the laser cavity such that it is pumped by light from the second optical pump source, wherein each polarisation modifying apparatus and associated one or more reflectors is configured such that the polarisation of optical pump light which has undergone a first pass through a given gain medium is modified, and the optical pump light is then directed back into that gain medium.

The optical apparatus may further comprise a second optical pump source and a second gain medium, the second gain medium being positioned in the laser cavity such that it is pumped by light from the second optical pump source, wherein the polarisation modifying apparatus and the one or more reflectors are configured such that the polarisation of optical pump light which has undergone a first pass through a first gain medium is modified, and the optical pump light is then directed into the second gain medium.

The gain medium may form part of an optical amplifier.

The gain medium may be Nd:YVO$_4$ and the optical pump source may be arranged to generate light having a peak or weighted average wavelength between 870 nm and 900 nm The gain medium may be Nd:YVO$_4$ and the optical pump source may be arranged to generate light having a peak or weighted average wavelength between 891 nm and 895 nm.

According to a second aspect of the invention there is provided an optical apparatus comprising first and second gain media each of which exhibits polarisation dependent absorption along two axes, each gain medium having a weakly absorbing axis and a strongly absorbing axis, and an optical pump source arranged to direct pump light towards the first gain medium such that the pump light entering this gain medium has a component of its polarisation parallel to the weakly absorbing axis of the first gain medium, wherein the second gain medium is arranged such that a significant proportion of the component of light exiting the first gain medium with polarisation parallel to the weakly absorbing axis of the first gain medium is incident upon the second gain medium with polarisation which is substantially parallel to the strongly absorbing axis of the second gain medium.

At least 20 percent of the component of light exiting the first gain medium with polarisation parallel to the weakly absorbing axis of the first gain medium may be incident upon the second gain medium with polarisation which is substantially parallel to the strongly absorbing axis of the second gain medium.

The second gain medium may be oriented such that the strongly absorbing axis of the second gain medium is substantially parallel to the weakly absorbing axis of the first gain medium.

A polarisation modifying apparatus may be located between the first and second gain media, the polarisation modifying apparatus being configured to modify the polarisation of the pump light which exits the first gain medium before that light is incident on the second gain medium.

The strongly absorbing axis of the second gain medium may be substantially perpendicular to the strongly absorbing axis of the first gain medium.

One or more features of the first aspect of the invention may be combined with one or more features of the second aspect of the invention.

According to a third aspect of the invention there is provided a method of optically pumping a gain medium exhibiting polarisation dependent absorption along two axes, the gain medium having a weakly absorbing axis and a strongly absorbing axis, wherein the method comprises directing pump light onto a first face of the gain medium such that the pump light entering the gain medium has a component of its polarisation parallel to the weakly absorbing axis of the gain medium, modifying the polarisation of the pump light after it has exited the gain medium, then directing the pump light back into the gain medium.

The component of the polarisation of the pump light that is parallel to the more weakly absorbing axis of the gain medium on entering the gain medium may be at least 20%.

The component of the polarisation of the pump light that is parallel to the more weakly absorbing axis of the gain medium on entering the gain medium may be at least 40%.

The component of the polarisation of the pump light that is parallel to the more weakly absorbing axis of the gain medium on entering the gain medium may be at least 60%.

The pump light may have a peak or weighted average wavelength at which the absorption coefficient for light polarised parallel to the strongly absorbing axis of the gain medium is at least a factor of 4 greater than the absorption coefficient for light polarised parallel to the weakly absorbing axis of the gain medium at this wavelength.

The pump light may have a peak or weighted average wavelength at which the absorption coefficient for light polarised parallel to the strongly absorbing axis of the gain medium is at least a factor of 6 greater than the absorption coefficient for light polarised parallel to the weakly absorbing axis of the gain medium at this wavelength.

The pump light may have a peak or weighted average wavelength such that the ratio of the absorption coefficients of the strongly and weakly absorbing axes of the gain medium is greater than 4, and more than 50% of light having the more weakly absorbed component of pump polarisation exits the gain medium after a first pass through the gain medium, and the component of the polarisation of this light that is parallel to the more strongly absorbing axis on its second pass through the gain medium is greater than 50%.

Suitably, at least 30% of the component of pump light with polarisation parallel to the more weakly absorbing axis of the gain medium that is incident on the first face of the gain medium is not absorbed before exiting the gain medium.

Suitably, at least 55% of the component of pump light with polarisation parallel to the more weakly absorbing axis of the gain medium that is incident on the first face of the gain medium is not absorbed before exiting the gain medium.

One or more features of the third aspect of the invention may be combined with one or more features of the first or second aspects of the invention.

According to a fourth aspect of the invention there is provided a method of optically pumping first and second gain media each of which exhibits polarisation dependent absorption along two axes, each gain medium having a weakly absorbing axis and a strongly absorbing axis, wherein the method comprises directing pump light through the first gain medium, a portion of the pump light having a component of polarisation parallel to the weakly absorbing axis of the gain medium, then directing the pump light into the second gain medium, wherein the component of the pump light which exits the first gain medium with a polarisation parallel to the weakly absorbing axis of the gain medium is substantially parallel to the strongly absorbing axis of the second gain medium when it is incident upon the second gain medium.

The fourth aspect of the invention may be combined with one or more features of the first, second or third aspects of the invention.

Specific embodiments of the invention will now be described by way of example only, with reference to the accompanying drawings, in which:

FIGS. 1a-e are schematic diagrams of laser cavity pump arrangements which embody the invention;

Figure 1A:
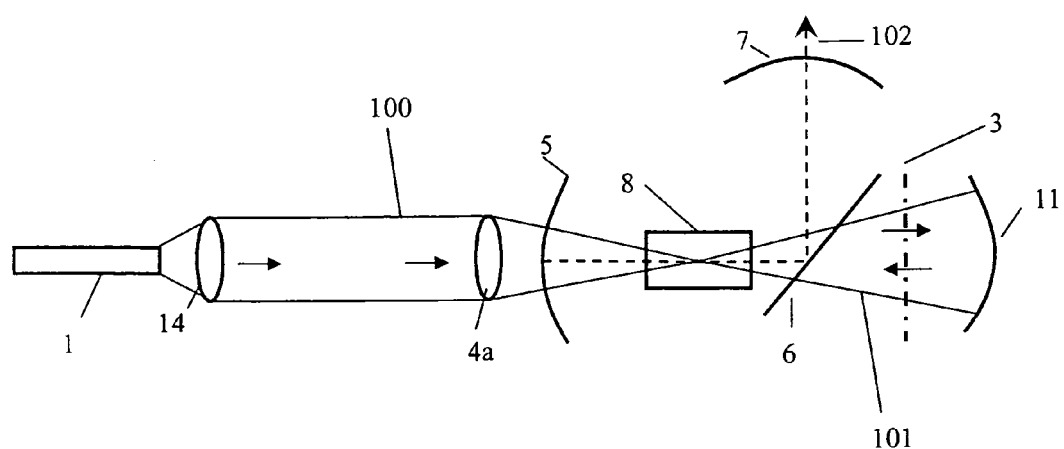

Described herein is an optical apparatus, which may be a laser cavity or an optical amplifier.

In the following description there are various references to light having a polarisation component parallel to an axis of a gain medium. When light is incident on a gain medium exhibiting polarisation dependent absorption along two axes, the light may have a component of its polarisation parallel to each of these two orthogonal axes. Whilst the polarisation of the light may not strictly be parallel to each of these axes, it can be considered to be made up of a superposition of light with each of these two orthogonal polarisations. If, for example, 50% of light is described as being parallel to such an axis, what is meant is that the light can be considered to be made up to two components, and that the component that is parallel to this axis accounts for 50% of the total light.

Pump light originating from one or more laser diodes is directed into a gain medium, with polarisation-dependent absorptions along two orthogonal axes. If said pump light initially has equal components of its polarisation parallel to each of the axes of the gain medium (as is the case for randomly polarised, circularly polarised or linearly polarised light at 45 degrees to said axes), pump light exiting the gain medium will have a higher component of the more weakly absorbed light than the more strongly absorbed light. This more weakly absorbed pump light can then be arranged to be absorbed by the more strongly absorbing axis of the same or another laser gain medium. This can also be the case for partially polarised light, such as light exiting from a non-polarisation-maintaining optical fibre.

It is preferred that the component of the polarisation of the pump light that is parallel to the more weakly absorbing axis is greater than 20%, 30% or even greater than 40%. It is also preferred that greater than 30%, greater than 50% or even greater than 55% of the more weakly absorbed pump light component is not absorbed in a first pass through the gain medium. It is further preferred that the component of the polarisation of this more weakly absorbed light that is subsequently made parallel to the more strongly absorbing axis on its second pass through the first gain medium (or first pass through a second gain medium) is greater than 50%.

This arrangement can facilitate the power-scaling of a laser cavity by spreading the thermal loading due to the pump light incident on the laser gain medium more evenly along its length. This can lead to lower thermal lensing and/or lower thermally induced aberrations within the gain medium.

Moreover, a pump wavelength can be chosen with a greater ratio of absorption coefficients than the more commonly used pump wavelengths (i.e. a greater difference between absorption coefficients for different polarisations). For example, Nd:YVO$_4$ has traditionally been pumped at around 808 nm, where its strongest absorption line for laser pumping exists. At this wavelength, the ratio of the absorption coefficients for c-axis and a-axis absorption $\alpha_c:\alpha_a$ is approximately 3:1. At its second strongest absorption peak around 880 nm, $\alpha_c:\alpha_a$ is also approximately 3:1.

If a pump wavelength is chosen at which the ratio of $\alpha_c:\alpha_a$ is larger, such as >4:1, >6:1 or ~8:1 (for example, using ~881 nm for Nd:YVO$_4$), the pump light that exits the gain medium will have a higher degree of linear polarisation. By carefully choosing the length and dopant concentration of the gain medium, it is possible to ensure that a significant proportion of the pump light that is polarised along the more weakly absorbing axis is not absorbed in this first pass though the crystal, and that most of the light polarised along the more strongly absorbing axis is absorbed. This is against conventional practise, which teaches that a pump wavelength should be tuned to obtain maximum overall absorption.

It is understood that pump diodes typically have a wavelength spread of a few nm, and it is therefore preferable to consider the effect of the gradient of absorption with respect to wavelength in the chosen pump wavelength region. For this reason, it is preferable to the use pump diodes with a narrow wavelength spread (for example less than 3 nm, less than 2.5 nm, or even less than 2 nm full width at half maximum (FWHM)) for regions where the gradient of absorption is steep, such as at 880 nm to 883 nm in the case of Nd:YVO$_4$.

Pump light exiting the gain medium with a high degree of linear polarisation can then have its polarisation modified such that it is polarised substantially parallel to the more strongly absorbing axis of the gain medium, before being refocused back into the gain medium.

In optimised arrangements, this can result in >60%, >70%, >80% or even >90% of the absorbed pump light being absorbed at the absorption coefficient of the more strongly absorbing axis, even if the pump light is initially randomly polarised. This may provide benefits similar to those seen when using double-end-pumping with linearly polarised pump beams, without requiring an initially polarised pump beam to be used. This is particularly advantageous when the pump light is delivered via an optical fibre, since optical fibres tend to depolarise the light as it travels along them.

For Nd:YVO$_4$ to be used in higher power laser devices, it may be favourable to use the absorption peak at approximately 893 nm (or for example between 891 nm and 895 nm, or more optimally between 892 and 894 nm). This has the following benefits:

1) The gradient of pump absorption coefficient with respect to wavelength can be low or zero, thereby reducing the requirement to have a precise pump wavelength and also reducing the requirement to have a narrow pump spectral width.
2) The quantum defect is lower than the quantum defect at the common pump wavelength of ~808 nm (and slightly lower than the quantum defect at 880 nm)
3) The absorption coefficient is approximately 10 or more times lower than the absorption coefficient at 808 nm, leading to lower thermal lensing and thereby allowing for more power scalability.
4) The ratio of the absorption coefficients for the a axis and c axis is approximately 6 (with greater absorption by the a-axis in this case), providing good compatibility with the laser cavity and amplifier pump arrangements described herein.

Instead of using a single gain medium, two or more gain media can be used. Where this is done the light exiting the first gain medium, which is largely polarised along the weakly absorbing axis, subsequently enters a second gain medium whereby the light is now polarised mainly along the more strongly absorbing axis.

An arrangement in which two gain media are bonded together, with or without an optical element located between them, are still considered as two separate gain media for the purposes of this description.

At locations in the description which relate to a crystal gain medium, the term 'single gain medium' may be interpreted as referring to a gain medium which is a single crystal.

FIG. 1a shows a laser cavity including three cavity mirrors 5, 6 and 7, and a gain medium 8. The gain medium 8 exhibits polarisation dependent absorption of pump light. Pump light is provided via an optical fibre 1, and collimated by a lens 14, before being focussed into the gain medium by a second lens 4a. Solid lines 100 with arrows are utilised to indicate the direction of pump light. The pump light may for example be circularly polarised or be randomly polarised. The gain medium absorbs the pump light as it passes through the gain medium. This absorption is strongly polarisation dependent, for example with a ratio of 6:1.

Pump light that is not absorbed by the gain medium in the first pass travels out of the laser cavity through fold mirror 6. This pump light 101 is predominantly polarised along the more weakly absorbing axis of the gain medium (as a result of the strongly polarisation dependent absorption of the pump light). The polarisation state of the pump light is changed to elliptical or circular polarisation upon travelling through a quarter-wave plate 3. The pump light is reflected back through the quarter-wave plate 3 by a concave pump light reflecting mirror 11. On passing back through the quarter-wave plate 3 the polarisation state of the pump light changes to a substantially linear polarisation which is orthogonal to the original substantially linear polarisation. The effect of the double pass through the quarter-wave plate 3 is thus to rotate the polarisation of the pump light through 90 degrees. This pump light now has the polarisation which is strongly absorbed by the gain medium, and is absorbed when it passes into the gain medium.

Dotted lines with arrows 102 are used to indicate laser light emitted from the gain medium 8.

The gain medium is pumped with light at a wavelength at which polarisation dependent absorption occurs. The pump light is then rotated and sent back into the gain medium. The laser cavity therefore effectively provides double ended pumping of the gain medium via a double-pass arrangement, even though a single optical fibre 1 is used to deliver the pump light.

Examples of suitable gain medium 8 include Nd:YVO$_4$, Nd:GdVO$_4$ and Nd:YLF. Alternatively, a gain medium may be used in which the active element is Ytterbium (Yb) or Erbium (Er) for example. Laser cavity mirrors 5 and 6 are arranged to be reflective at the fundamental wavelength of the laser, and to be transmissive at the wavelength of the pump light. The term 'reflective' is not intended to mean that 100% of light is reflected, but is instead intended to mean that sufficient light is reflected for the required purpose. The term 'transmissive' is not intended to mean that 100% of light is transmitted, but is instead intended to mean that sufficient light is transmitted for the required purpose.

Mirrors 5, 6 and 7 together provide a resonant laser cavity for the fundamental laser wavelength. End mirror 7 is arranged to be partially transmissive at the fundamental laser wavelength, such that a predetermined incident portion of light at the fundamental laser wavelength is transmitted through the mirror 7, thereby providing the laser output 102. Mirrors 5 and 7 act as end mirrors, and are preferably curved. The laser cavity is formed as a dog leg, with an end mirror 5, 7 at each end. Mirror 6 is arranged at an angle of incidence of substantially 45 degrees (or possibly 50 degrees), and acts as a fold mirror. It is appreciated that this angle of incidence is not critical to this embodiment of the invention, and could have other values (for example in the range of 0 degrees to 90 degrees in the limiting cases).

In this particular embodiment only a single gain medium is utilised.

A device other than a quarter-wave plate can be used to alter the polarisation state of the retro-reflected pump light. It is not required that the polarisation is flipped by 90 degrees, only that a significant proportion of the light that was originally polarised parallel to the more weakly absorbing axis of the gain medium is modified to be absorbed by the more strongly absorbing axis of the gain medium.

The laser cavity used in the embodiment of the invention shown in FIG. 1a is merely an example, and does not restrict the field of the invention. Any other laser cavity could be used with the pumping scheme (i.e. retro-reflection of polarisation rotated pump light).

The cavity is folded to allow laser output 102 to be extracted from the laser cavity without first having to travel through wave plate 3 and pump mirror 11. The wave plate 3 and pump mirror 11 would cause extra loss to the laser output and would then preferably be antireflection coated for this wavelength to minimise the losses. Wave plate 3 would modify the polarisation of the laser output unless it was ensured that it was a full-wave plate for the fundamental laser wavelength. Providing the antireflection coating, and ensuring that wave plate 3 is a full-wave plate at the fundamental laser wavelength would add to the complexity and cost of the laser.

Figure 1B:
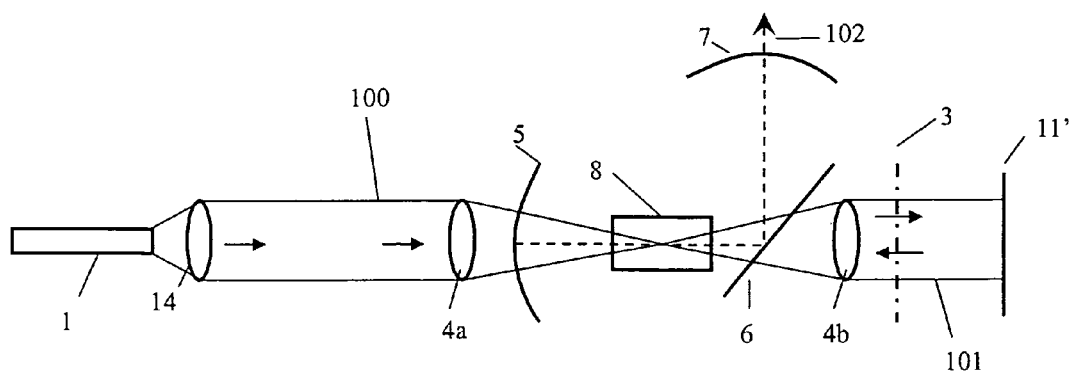

FIG. 1b illustrates an alternative embodiment of the invention. In FIG. 1b features which correspond with those shown in FIG. 1a are identified using the same reference numerals. This also applies to subsequent figures. Similarly, in FIG. 1b and subsequent figures solid lines with arrows are utilised to indicate the direction of pump light. Dotted lines with arrows are utilised to indicate the direction of laser light originating from the solid state laser gain medium or being amplified by it.

The embodiment shown in FIG. 1b is a pumping configuration where concave mirror 11, as was shown in FIG. 1a, is replaced by plane, pump reflecting mirror 11' and lens 4b. The quarter-wave plate may be anywhere between mirrors 6 and 11'. Preferably, the quarter-wave plate is between lens 4b and mirror 11' (as shown), because this allows the pump light to be perpendicularly incident upon wave plate 3, thereby increasing its effectiveness.

Figure 1C:
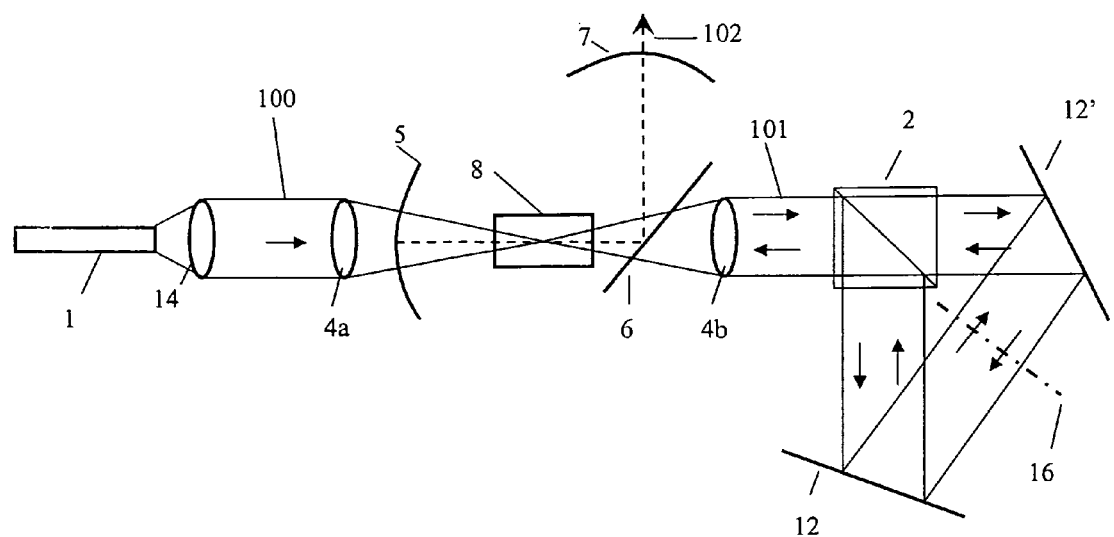

FIG. 1c illustrates another alternative pumping configuration, where mirror 11 and quarter-wave plate 3 shown in FIG. 1 are replaced by an alternative arrangement. The pump light exiting the gain medium after a first pass 101 is split by a polarising beam splitter 2. Each portion of this light is reflected back to the polarising beam splitter, due to plane mirrors, 12 and 12'. On this triangular roundtrip, the beam travels though a half-wave plate 16 with axes oriented at approximately 45 degrees to the plane of the figure. The half-wave plate rotates the polarisation of the pump light through substantially 90 degrees. Thus, the pump light which is directed by the polarising beam splitter 2 back towards the gain medium 8 has a polarisation which has been rotated through substantially 90 degrees.

Figure 1D:
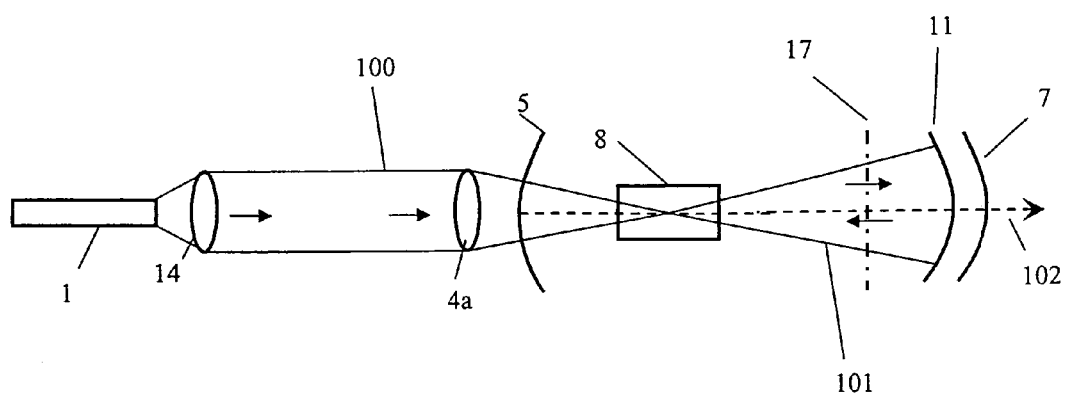

FIG. 1d illustrates an embodiment wherein the pump reflecting mirror 11 is located within the laser cavity. The cavity is not folded, and is now defined by cavity mirrors 5 and 7. As the fundamental laser light resonant in the cavity now travels through pump mirror 11, the pump mirror is preferably chosen to be substantially transmitting at this wavelength, whilst still remaining substantially reflective at the wavelength of the pump light. A wave plate 17 is a quarter-wave for the pump light, but is full-wave for the fundamental laser light (so as not to change its polarisation). This wave plate may be anti reflection coated for both pump wavelength and fundamental laser wavelength so as to reduce losses.

The fundamental laser light 102 has to pass through wave plate 17 and pump mirror 11 before exiting the cavity regardless of whether the cavity is subsequently folded. Since folding the cavity no longer allows for easier extraction of the fundamental laser light 102 (as it did in the embodiments of FIGS. 1a to 1c), in this embodiment a linear cavity is used.

It is appreciated that wave plate 17 could be bonded onto gain medium 8 for ease of assembly and a possible reduction in optical losses. Additionally, pump mirror 11 could be bonded onto wave plate 17, again for ease of assembly and for possible reduction in optical losses, although this may be difficult to achieve unless pump mirror 11 is chosen to be a plane mirror. Alternatively, mirror 11 could simply be an optical coating that is coated onto one face of wave plate 17. This coating would be arranged to substantially reflect pump light whist substantially transmitting the fundamental laser light resonant in the cavity.

Figure 1E:
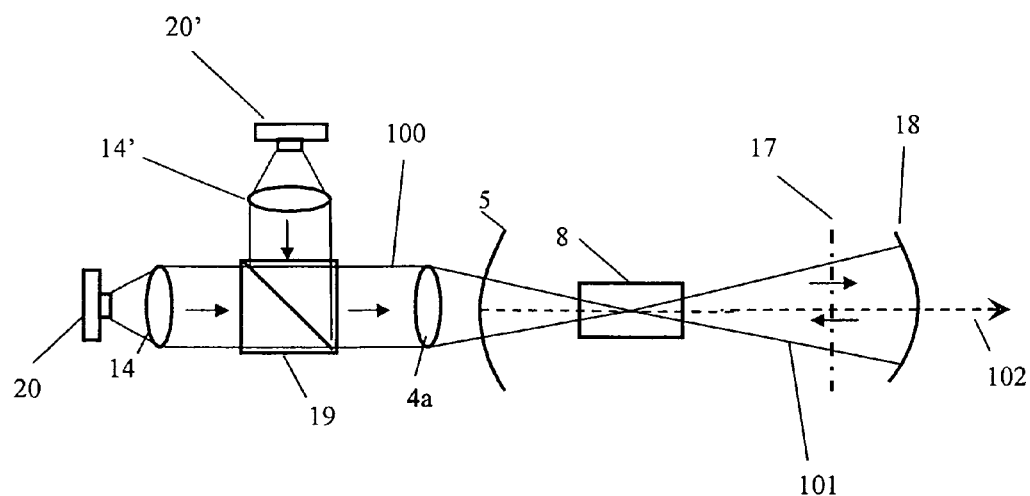

FIG. 1e illustrates an embodiment whereby a mirror that is used to form the laser cavity is also used to reflect the pump light. This dual purpose mirror 18 replaces the functions of one of the cavity mirrors 7 and the pump mirror 11 from FIG. 1d. The dual purpose mirror 18 is therefore coated to be substantially reflective at the wavelength of the pump light, but partially transmitting at the fundamental laser wavelength to act as an output coupling mirror.

Also shown in this embodiment is an arrangement of two laser diode sources, 20 and 20' being collimated by lenses 14 and 14' before being combined with a polarising beam splitter 19 before being used to pump gain medium 8. This arrangement can be used to increase pump light brightness. The arrangement may also be applied to other embodiments of the invention. Other arrangements which combine laser diodes may be used.

As shown in the figure, laser diode 20 would be polarised in the plane of the figure to be substantially transmitted by polarising beam splitter 19 whilst laser diode 20' would be polarised perpendicular to the plane of the figure to be substantially reflected by polarising beam splitter 19. One diode can thereby be arranged to supply pump light substantially parallel to the more strongly absorbing gain axis, whilst the other can be arranged to supply pump light substantially parallel to the more weakly absorbing axis of the gain medium. By adjusting the power output of each of laser diodes 20 and 20', we can thereby adjust the proportion of light substantially parallel to each of the gain axes. This can be particularly useful if it is desired to adjust these ratios in order to make the overall pump light absorption profile more symmetrical.

The two laser diodes may be configured to emit pump light at different wavelengths or at the same wavelength. Where different wavelengths are used, one of the wavelengths may fall outside of the ranges specified elsewhere in this document. Where different wavelengths are used, the combination of wavelengths may be such that the weighted average wavelength (or the wavelength with highest peak power) may fall outside of the wavelength ranges specified in other parts of this document. However, even if this is the case, it is expected that the wavelength used by one of the laser diodes will fall within these ranges. The same applies to other ranges specified in this document. For example, references to the percentage of pump light polarised in a given direction might be interpreted as being in relation to the pump light from one of the laser diodes.

Figure 2:
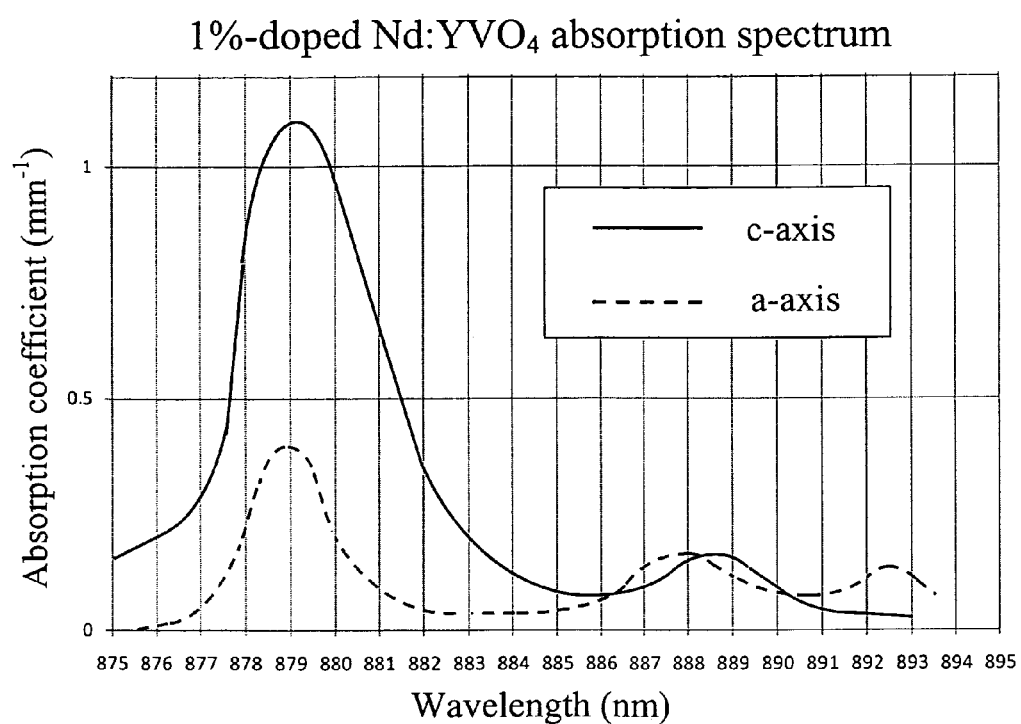
FIG. 2 shows the absorption spectra for 1% doped Nd:YVO$_4$.

FIG. 2 shows the absorption spectra for 1% doped $Nd:YVO_4$ for light polarised parallel to the a-axis (dotted line) and light polarised parallel to the c-axis (solid line) over the range of 875 to 895 nm (in fact most of the wavelength range from 870 nm to 900 nm could be of interest, although absorption coefficients become very low at the ends of this range). The main absorption peak of $Nd:YVO_4$ is at around 808 nm, but this is not included in FIG. 2. Instead, it is preferred to focus on the 875-895 nm range for two reasons:

1) There are regions here (such as 880 nm to 883 nm and 892 to 894 nm) where the ratio of the absorption coefficients can be large, thereby optimising the effect of the present invention. The broader ranges of 878-884 nm and 891-895 nm are still of interest, however, as the invention only relies on there being some difference between the two absorption coefficients.
2) The quantum defect is lower than at 808 nm, due to direct pumping of the upper lasing level. This allows for less heat generation due to pump absorption, and provides a more efficient system.

It can be seen that the ratio of absorption coefficients when pumping at 879 nm is approximately 3:1, whereas pumping at 881 gives a ratio of approximately 7:1. The beneficial effects of pumping at 881 nm using the present invention can be seen in FIG. 3a, which is explained further below.

It can also be seen from FIG. 2 that the ratio of absorption coefficients when pumping at 892.5 nm is approximately 5:1. This may be beneficial compared with pumping at 888.5 nm. This is shown in FIG. 3b, as explained further below.

Figure 3A:
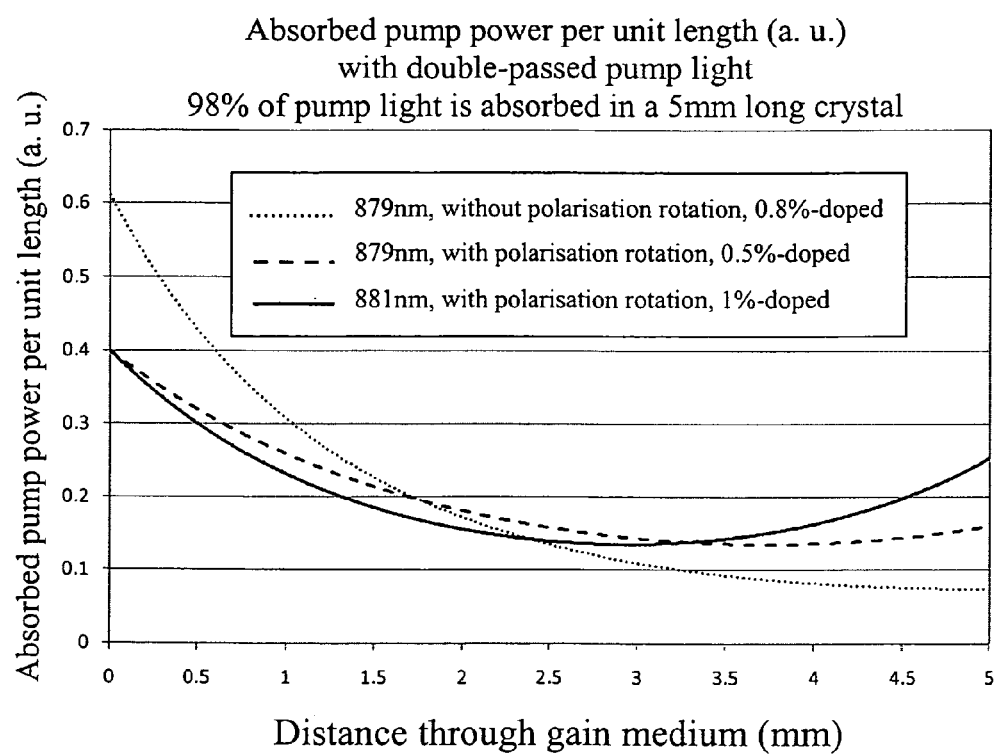
FIGS. 3a and 3b show calculated absorbed pump power per unit length through the gain medium of embodiments of the invention.
Figure 3B:
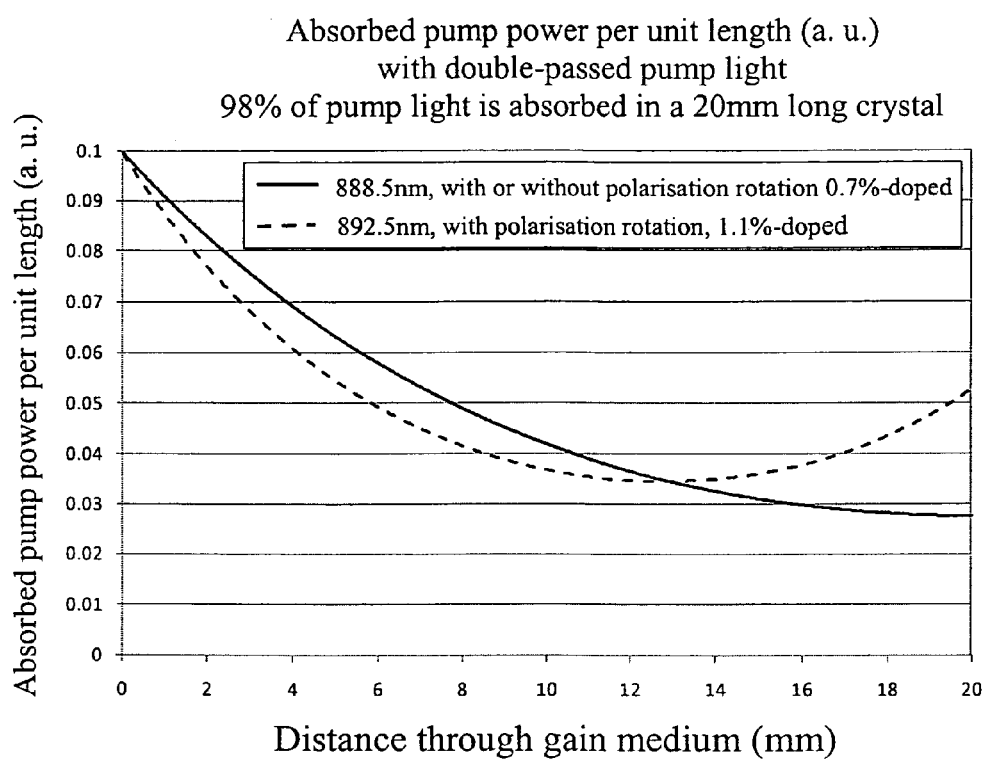

FIG. 3a shows calculated absorbed pump power per unit length through a 1% doped Nd:YVO$_4$ gain medium, double passing pump light through the gain medium at 879 nm (with and without the polarisation rotation) and also for 881 nm (with the polarisation rotation). It is assumed that the pump light is initially randomly polarised. In each of the three cases, 98% of the total pump light is absorbed and the crystals are all 5 mm long. The dotted line shows the absorbed pump power distribution for a 879 nm pumped crystal of dopant concentration 0.8% where the pump beam is double-passed without polarisation rotation (as known in the prior art). It is desirable to have absorbed pump power per unit length which is symmetrical about the centre of the crystal, because this reduces problems arising from thermal lensing. It can be seen in FIG. 3a that the dotted line is very far from being symmetrical about the centre of the crystal.

The dashed line shows the absorbed pump power distribution when the pump polarisation is rotated by 90 degrees before the second pass through the crystal. This results in a lower dopant concentration of 0.5% being required to achieve 98% pump light absorbed. Furthermore, it provides absorbed pump power per unit length which, although not symmetrical about the centre of the crystal, has less asymmetry than the dotted line.

The solid line shows a further improvement which is achieved by choosing a wavelength of 881 nm, where the absorption coefficients of the two axis of the gain medium have a greater ratio. In this case, the pump light is again rotated by 90 degrees before the second pass and now a 1% doped crystal is required to achieve 98% total pump absorption, due to the lower absorption of the gain medium at this wavelength. It can be seen that the absorbed pump power per unit length, although still not symmetrical about the centre of the crystal, has far less asymmetry than the dotted line (and less asymmetry than the dashed line). The solid line is the most uniform and symmetrical of the three examples. This is useful as it reduces both thermal aberrations and thermal lensing.

It may even be beneficial in some circumstances for the component of the polarisation of the pump light that is initially parallel to the more weakly absorbing axis to be greater than 50 percent, greater than 60 percent, greater than 75 percent or substantially all of the pump light. This could allow for a more symmetrical pump light absorption profile after the polarisation rotation and double pass of the pump light.

A further improvement which could be made is the addition of bonded undoped end caps. Whilst these would not affect the distribution of heat generation in the crystal, they would help to conduct heat away from the end faces of the crystal, thereby reducing thermal lensing and aberrations.

FIG. 3b shows the calculated absorbed pump power per unit length through the doped Nd:YVO$_4$ gain medium for a double pass of pump light at 888.5 nm, compared with a double pass at 892.5 nm with a 90 degree polarisation rotation. Again, it is assumed that the pump light is initially randomly polarised. The gain medium in this case is 20 mm long and the dopant concentration is chosen such that in each case, 98% of the total pump light is absorbed. In order to achieve this, the gain medium pumped at 888.5 nm has a dopant concentration of approximately 0.7%. Absorption in this case is denoted by the solid line. The gain medium pumped at 892.5 nm with the polarisation rotation has a dopant concentration of approximately 1.1%. Absorption in this case is denoted by the dashed line. It can be seen that whilst the absorbed pump power per unit length at the entrance face of both gain media (at position=0 mm) is similar, absorption reduces more rapidly in the case of the 892.5 nm pumped gain medium as we move away from the entrance face. In addition to this, the overall profile of absorbed pump power at 892.5 nm is more uniform. Indeed, it is even similar to the absorbed pump power distribution obtained from double-end pumping with polarised beams, which is generally considered to be an ideal case.

Figure 4:
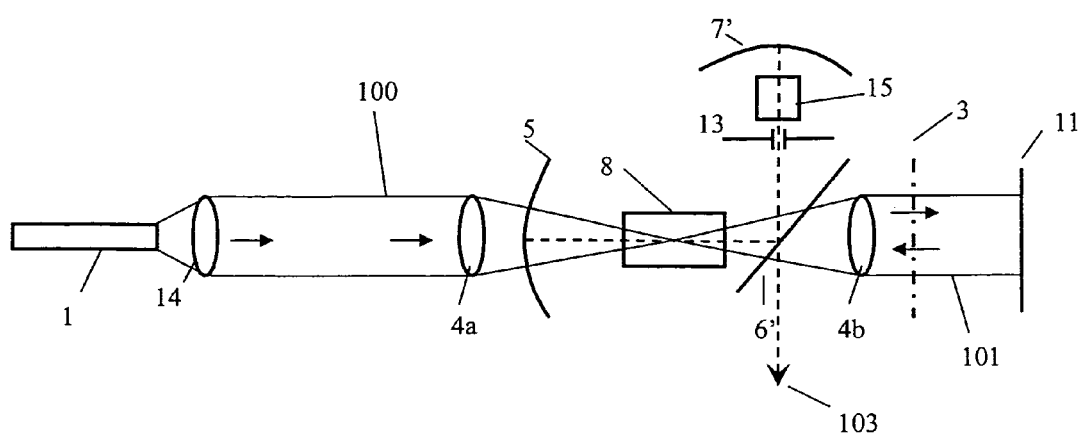
FIGS. 4 to 8 are schematic diagrams of additional laser cavity pump arrangements which embody the invention.

FIG. 4 illustrates an alternative embodiment of the invention. The embodiment comprises a cavity arrangement arranged to provide an output wavelength approximately half that of the fundamental laser wavelength. The configuration of the cavity in FIG. 4 is generally similar to that shown in FIG. 1b, and components which are common to FIG. 1b are not be described again in detail.

In order to change the fundamental laser wavelength output from the laser gain medium 8 to light at half its wavelength (or twice its frequency), a frequency doubling crystal 15 is provided. The frequency doubling crystal 15 is located within the resonant cavity formed by end mirrors 5, 7' and fold mirror 6'. In this particular embodiment, fold mirror 6' is arranged as the output mirror, and hence is arranged to transmit a significant portion of the frequency doubled radiation. End mirror 7' is therefore arranged to reflect substantially all of the light at fundamental laser wavelength and also that at the frequency doubled wavelength. The resulting laser cavity outputs light 103 through mirror 6' at the frequency doubled wavelength.

The frequency doubling process is a non-linear process which requires a high intensity of the fundamental laser light in order to be efficient. Thus, a beam waist of the fundamental laser mode is chosen to be adjacent or within the frequency doubling crystal 15, so as to maximise the intensity of the fundamental wavelength within the frequency doubling crystal, and to maximise efficiency of the frequency doubling process.

In this particular embodiment an intra-cavity aperture 13 is also located within the cavity formed by end mirrors 5, 7'. The aperture is located along the optical path between the gain medium 8 and the frequency doubling crystal 15. The aperture 13 is defined by a plate. The aperture is located and sized to cause high optical losses to the higher order laser modes, so as to prevent the higher order laser modes lasing (oscillating). Thus, with a suitable choice of aperture size, the laser output can be constrained to a low order or fundamental TEM$_{00}$ spatial mode profile. It is appreciated that the intra-cavity aperture can be placed anywhere along the cavity axis, as long as it remains aligned with the laser beam.

In practice, it may be possible to constrain the beam quality $M^2$ parameter of the laser beam quality to <1.5, in some cases <1.3 or even <1.1 with output powers of in excess of 10 Watts.

Figure 5:
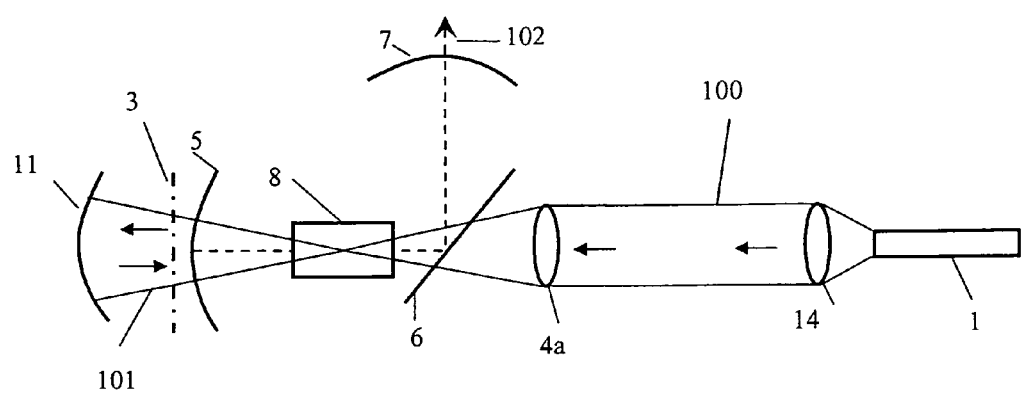

FIG. 5 shows an alternative embodiment of the invention, which is an alternative way of pumping the folded laser cavity compared to FIG. 1a. The laser cavity itself remains the same, but in some circumstances, it may be convenient to reverse the pumping arrangement as shown here.

Figure 6A:
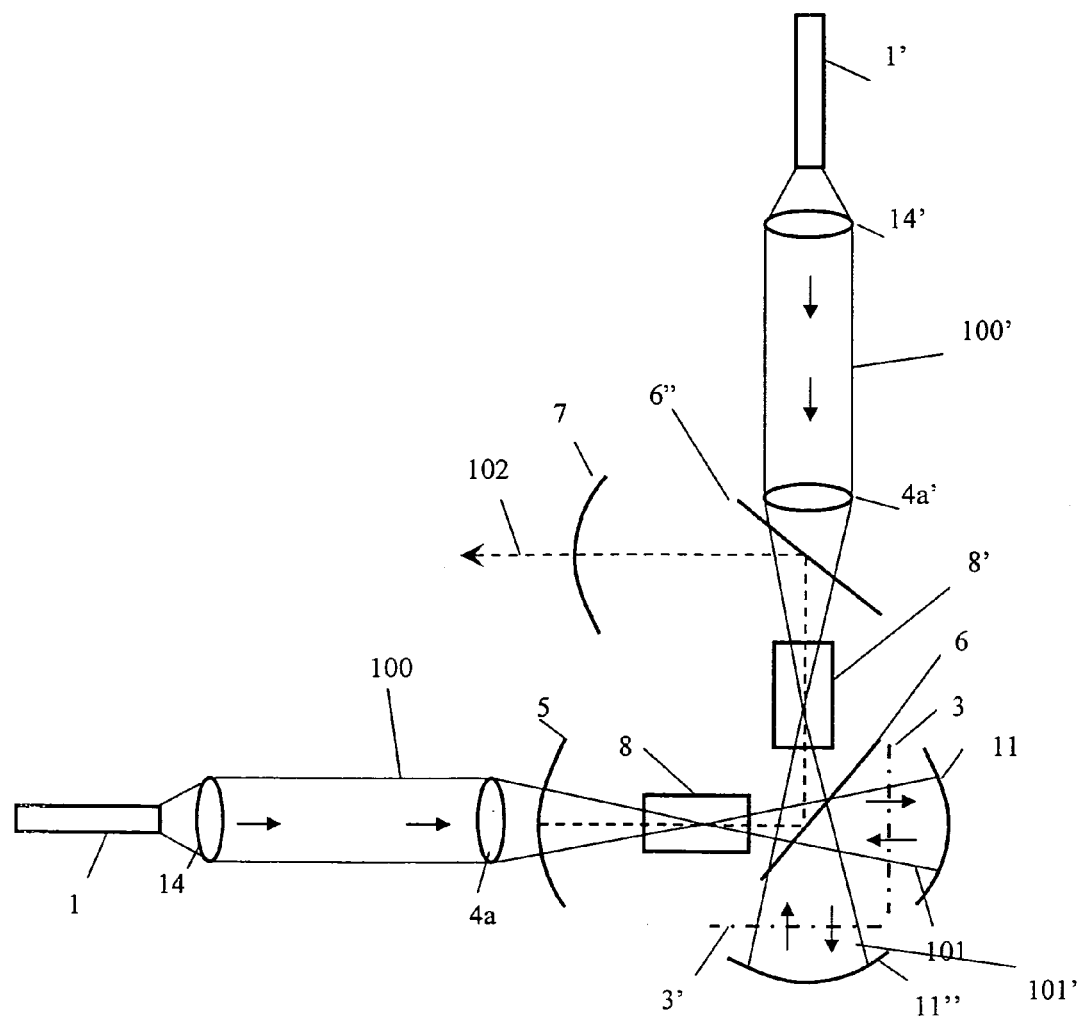

FIG. 6a shows an alternative embodiment of the invention, with two gain media, as well as two pump sources and associated mirrors to show the scalability of the design. The embodiment includes an additional cavity fold mirror 6", an additional gain medium 8', an additional quarter-wave plate 3', and an additional pump reflecting mirror 11". The embodiment also includes an additional pump source 1' such as an optical fibre, an additional pump collimating lens 14', and an additional pump focussing lens 4a'. Additional collimated pump light 100' is directed into the additional gain medium 8'. 101' designates pump light exiting the gain medium 8' after the first pass through the gain medium. Benefits of this technique may start to become quite significant when as little as 20 percent of the component of light exiting the first gain medium with polarisation parallel to the weakly absorbing axis of the first gain medium is incident upon the second gain medium with polarisation which is substantially parallel to the strongly absorbing axis of the second gain medium.

Figure 6B:
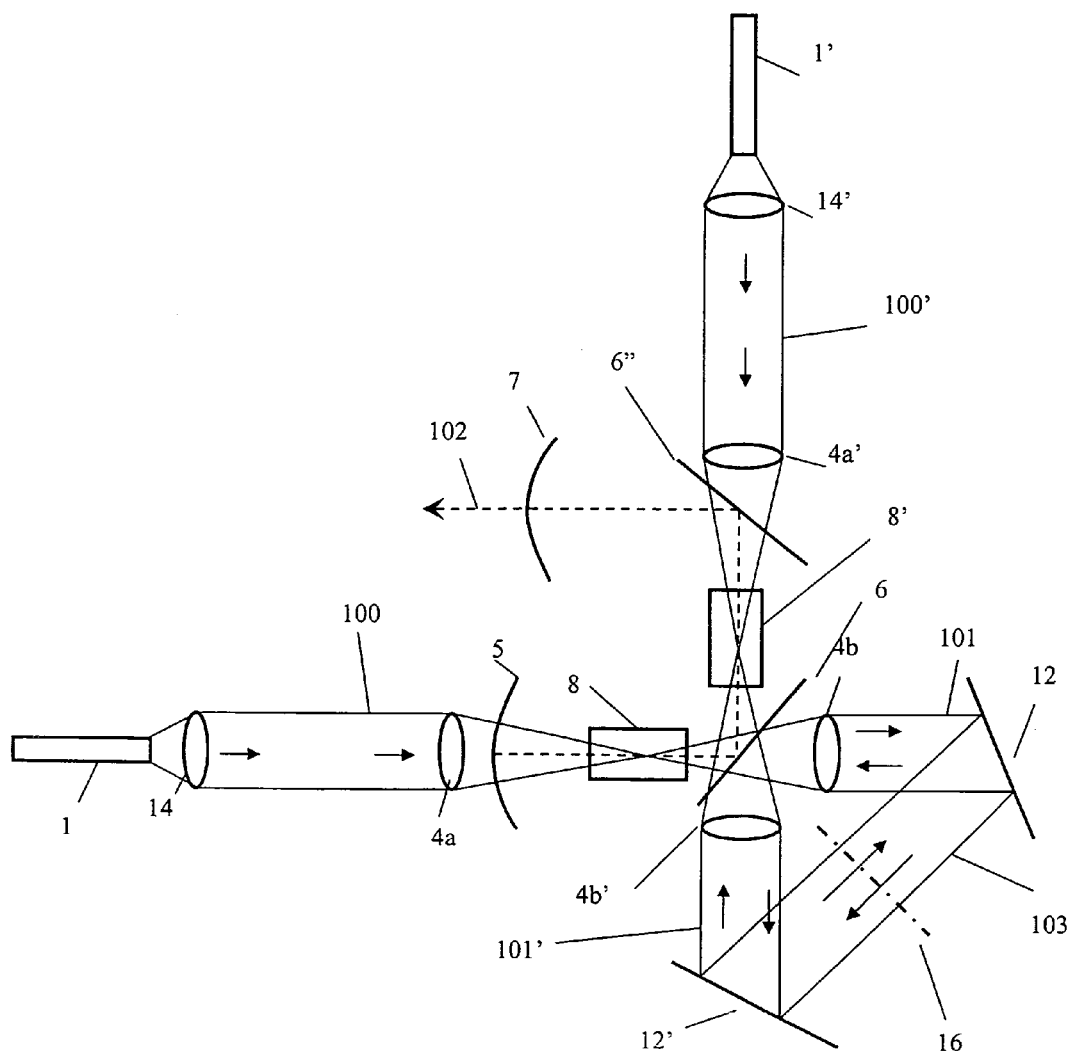

FIG. 6b shows how the two pump beams could be aligned together, in order that the each portion of pump light travels through both of the gain media. Mirror 12 is oriented such that beam 101 is reflected through half-wave plate 16 and then onto mirror 12' and back along the opposite direction to beam 101'. The same happens for beam 101' being reflected back in the opposite direction to beam 101.

Figure 7A:
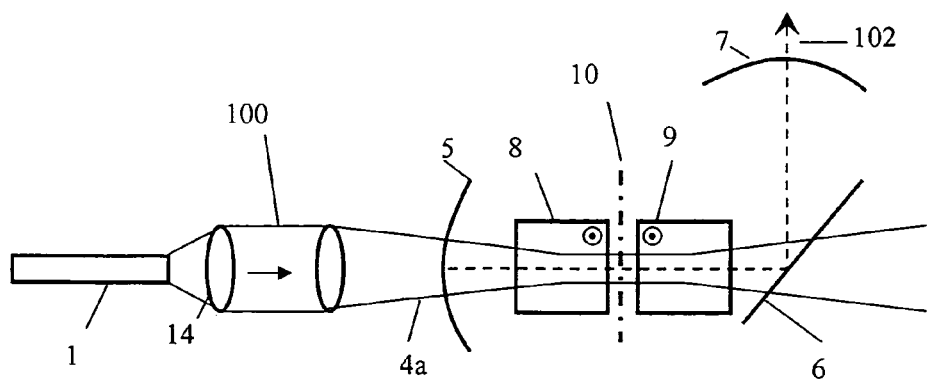

FIG. 7a shows how two gain media can be pumped by the same pump source when the two gain media have their more strongly absorbing axes orientated parallel to each other. A circle with a spot inside on gain media 8 and 9 denotes that the strongly absorbing axes are perpendicular to the plane of the figure. A wave plate 10 is inserted between the two gain media. This wave plate 10 is a full wave plate for the lasing wavelength (thereby causing it no overall change of polarisation), and preferably a half-wave plate for the pumping wavelength. The axes of this wave plate are arranged at substantially 45 degrees to the plane of the figure. This embodiment allows for a significant portion of the light that is first polarised parallel to the more weakly absorbing axis to exit the first gain medium and then subsequently be incident on a second gain medium such that a significant proportion of this light is then parallel to the more strongly absorbing axis.

Figure 7B:
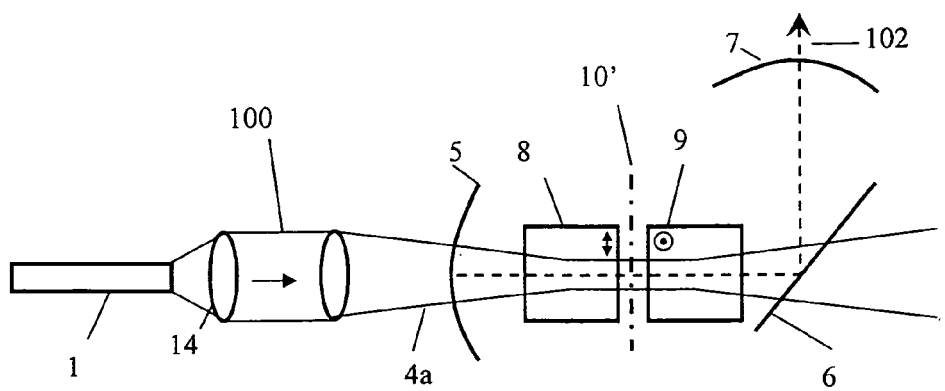

FIG. 7b is similar to FIG. 7a, but with the two gain media being oriented with their more strongly absorbing axes orientated perpendicularly to each other. A double arrowhead symbol on gain medium 8 denotes that the more strongly absorbing axis is parallel to the plane of the figure. The wave plate 10' is half-wave for the lasing wavelength, and preferably full-wave for the pumping wavelength and has its axes at substantially 45 degrees to the plane of the figure.

It is appreciated that the wave plate is not essential to this embodiment. It is added to ensure that the fundamental laser light emitted with a polarisation parallel to the more strongly absorbing axis of gain medium 8 is then made parallel to the more strongly absorbing axis of gain medium 9. The same is true for the more weakly absorbing axes. This situation is preferred, since one of the axes is likely to have a stronger laser emission than the other and it is therefore beneficial to use this same axis in both gain media.

This embodiment again allows for a significant portion of the light that is first polarised parallel to the more weakly absorbing axis to exit the first gain medium and then subsequently be incident on a second gain medium such that a significant proportion of this light is then parallel to the more strongly absorbing axis.

Figure 8:
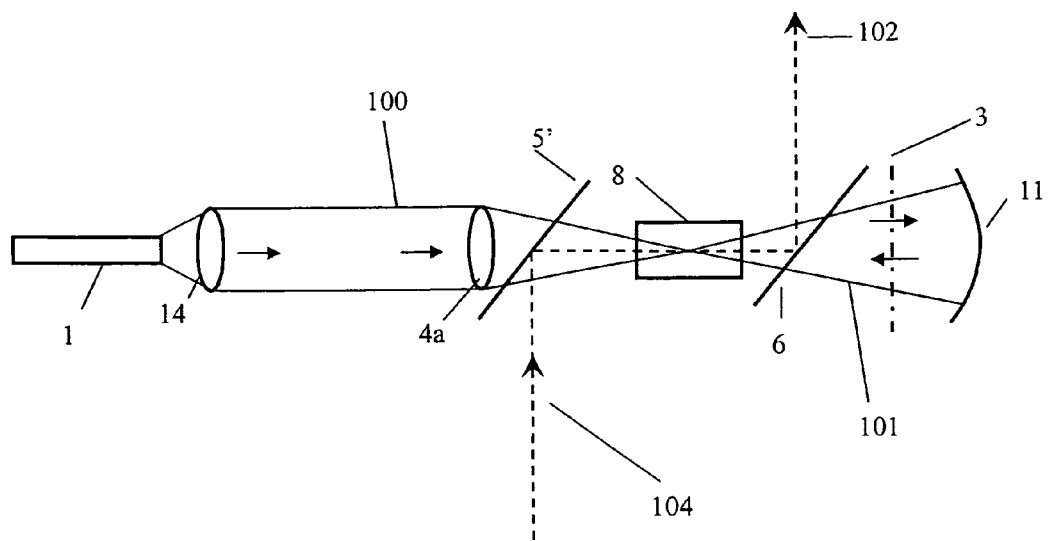

FIG. 8 shows an embodiment of a laser amplifier rather than laser oscillator. 5' and 6 are mirrors designed to transmit the pump light, but to reflect light at the wavelength of the input light 104. Light 104 enters gain medium after reflecting off mirror 5'. It then reflects off mirror 6 and before leaving the amplifier as light 102.

In the above description the use of the term 'light' is not intended to limit to visible wavelengths, but is instead intended to include any suitable wavelength of electromagnetic radiation.

In the above description the terms weakly absorbing axis and strongly absorbing axis are not intended necessarily to apply absolute absorption values to the axes. The term 'strongly absorbing axis' is intended to refer to an axis which is more strongly absorbing than the 'weakly absorbing axis'. The term 'weakly absorbing axis' is intended to refer to an axis which is more weakly absorbing than the 'strongly absorbing axis'.

In the above description the term 'substantially 90 degrees' is intended to mean 90 degrees or sufficiently close to 90 degrees to achieve the intended purpose. An equivalent meaning is intended to apply to the term '45 degrees'.

In the above description the term 'optical amplifier' is intended to mean an apparatus which amplifies light but does not induce laser oscillation.

In some of the described embodiments of the invention a wave plate is used to rotate the polarisation of the pump light. It is not essential however that a wave plate is used. For example, a mirror arrangement may be used to flip the polarisation of the pump light. Alternatively, other suitable optical components or combinations of components may be used to modify the polarisation of the pump light. The wave plate or mirror arrangement may be considered to be examples of a polarisation modifying apparatus. A polarisation modifying apparatus may be considered to be an apparatus whose purpose is to modify the polarisation of light.

In some of the described embodiments of the invention the polarisation of the pump light is rotated. It is not essential however that the polarisation of the pump light is rotated. The polarisation of the pump light may be modified in some other way. For example, the pump light may be modified such that a proportion of the pump light with its polarisation parallel to the weakly absorbing axis of the gain medium has its polarisation modified to be parallel to the strongly absorbing axis of the gain medium. This modification of the polarisation may be to a sufficient degree that any loss of efficiency of the optical apparatus which arises due to the presence of the polarisation modifier is compensated for, such that the overall efficiency of the optical apparatus is not diminished.

In some of the described embodiments of the invention the pump light is reflected back to the gain medium using one or more mirrors. It is not essential however that mirrors are used. For example, prisms or other components may be used to reflect the pump light. These may all be considered to be examples of reflectors.

The invention claimed is:

1. An optical apparatus comprising:
   first and second gain media each of which exhibits polarisation dependent absorption along two axes, each gain medium having a weakly absorbing axis and a strongly absorbing axis; and
   an optical pump source arranged to direct non-plane polarised pump light towards the first gain medium such that the non-plane polarised pump light entering this gain medium has a component of its polarisation parallel to the weakly absorbing axis of the first gain medium;
   wherein the second gain medium is arranged such that a significant proportion of the component of light exiting the first gain medium with polarisation parallel to the weakly absorbing axis of the first gain medium is incident upon the second gain medium with polarisation which is substantially parallel to the strongly absorbing axis of the second gain medium;

wherein the optical apparatus is configured such that light emitted by the first gain medium has the same polarisation within the second gain medium as light emitted by the second gain medium;

wherein the second gain medium is oriented such that the strongly absorbing axis of the second gain medium is substantially parallel to the strongly absorbing axis of the first gain medium.

2. The optical apparatus of claim 1, wherein at least 20 percent of the component of light exiting the first gain medium with polarisation parallel to the weakly absorbing axis of the first gain medium is incident upon the second gain medium with polarisation which is substantially parallel to the strongly absorbing axis of the second gain medium.

3. The optical apparatus of claim 1, wherein a polarisation modifying apparatus is located between the first and second gain media, the polarisation modifying apparatus being configured to modify the polarisation of the non-plane polarised pump light which exits the first gain medium before that light is incident on the second gain medium.

4. The optical apparatus of claim 3, wherein the polarisation modifying apparatus comprises a wave plate.

5. The optical apparatus of claim 3, wherein the polarisation modifying apparatus is configured to modify the polarisation of the pump light but not significantly modify the polarisation of the emitted light.

6. The optical apparatus of claim 1, wherein the first and second gain media are located in one laser cavity.

7. The optical apparatus of claim 1, wherein the gain media are Nd:YVO$_4$ and the optical pump source is arranged to generate light having a peak or weighted average wavelength between 870 nm and 900 nm.

8. The optical apparatus of claim 1, wherein the gain media are Nd:YVO$_4$ and the optical pump source is arranged to generate light having a peak or weighted average wavelength between 891 nm and 895 nm.

9. An optical apparatus comprising:
first and second gain media each of which exhibits polarisation dependent absorption along two axes, each gain medium having a weakly absorbing axis and a strongly absorbing axis; and
an optical pump source arranged to direct non-plane polarised pump light towards the first gain medium such that the non-plane polarised pump light entering this gain medium has a component of its polarisation parallel to the weakly absorbing axis of the first gain medium;
wherein the second gain medium is arranged such that a significant proportion of the component of light exiting the first gain medium with polarisation parallel to the weakly absorbing axis of the first gain medium is incident upon the second gain medium with polarisation which is substantially parallel to the strongly absorbing axis of the second gain medium;
wherein the optical apparatus is configured such that light emitted by the first gain medium has the same polarisation within the second gain medium as light emitted by the second gain medium;
wherein the strongly absorbing axis of the second gain medium is substantially perpendicular to the strongly absorbing axis of the first gain medium.

10. The optical apparatus of claim 9, wherein a polarisation modifying apparatus is located between the first and second gain media, the polarisation modifying apparatus being configured to modify the polarisation of light emitted by the first gain medium such that it enters the second gain medium with the same polarisation as light emitted by the second gain medium.

11. The optical apparatus of claim 10, wherein the polarisation modifying apparatus is configured to modify the polarisation of the emitted light but not to significantly modify the polarisation of the pump light.

12. The optical apparatus of claim 9, wherein the first and second gain media are located in one laser cavity.

13. The optical apparatus of claim 12, wherein the polarisation modifying apparatus comprises a wave plate.

14. The optical apparatus of claim 12, wherein the polarisation modifying apparatus is configured to modify the polarisation of the pump light but not significantly modify the polarisation of the emitted light.

15. The optical apparatus of claim 9, wherein the gain media are Nd:YVO$_4$ and the optical pump source is arranged to generate light having a peak or weighted average wavelength between 870 nm and 900 nm.

16. The optical apparatus of claim 9, wherein the gain media are Nd:YVO$_4$ and the optical pump source is arranged to generate light having a peak or weighted average wavelength between 891 nm and 895 nm.

* * * * *